(12) United States Patent
Sakakida et al.

(10) Patent No.: US 7,709,764 B2
(45) Date of Patent: May 4, 2010

(54) POWER SUPPLY APPARATUS FOR ELECTRIC DISCHARGE MACHINE AND POWER SUPPLY CONTROL METHOD

(75) Inventors: Naka Sakakida, Tokyo (JP); Hiroyuki Ooguro, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 736 days.

(21) Appl. No.: 10/592,775

(22) PCT Filed: Apr. 18, 2005

(86) PCT No.: PCT/JP2005/007381

§ 371 (c)(1),
(2), (4) Date: Sep. 14, 2006

(87) PCT Pub. No.: WO2005/102578

PCT Pub. Date: Nov. 3, 2005

(65) Prior Publication Data

US 2008/0230521 A1    Sep. 25, 2008

(30) Foreign Application Priority Data

Apr. 19, 2004 (JP) .............................. 2004-122506

(51) Int. Cl.
| | |
|---|---|
| B23H 1/00 | (2006.01) |
| B23H 7/00 | (2006.01) |
| B23K 13/08 | (2006.01) |
| B23K 15/02 | (2006.01) |
| H05B 1/02 | (2006.01) |
| H05B 3/02 | (2006.01) |

(52) U.S. Cl. ................. 219/69.13; 219/69.16; 219/482; 219/490; 219/507

(58) Field of Classification Search ................. 219/482, 219/489, 490, 507, 69.16, 69.18
See application file for complete search history.

(56) References Cited

U.S. PATENT DOCUMENTS

| | | | | |
|---|---|---|---|---|
| 3,636,295 A | * | 1/1972 | Kondo | ...................... 219/69.13 |
| 4,004,123 A | * | 1/1977 | Inoue | ...................... 219/69.13 |
| 5,374,798 A | * | 12/1994 | Kinbara | ................... 219/69.18 |
| 6,107,593 A | * | 8/2000 | Tsai et al. | ................ 219/69.13 |
| 6,723,941 B2 | * | 4/2004 | Sato et al. | ............... 219/69.12 |
| 2002/0060205 A1 | * | 5/2002 | Tamida et al. | ............ 219/69.18 |
| 2004/0042142 A1 | * | 3/2004 | Ikeda | ........................ 361/103 |

FOREIGN PATENT DOCUMENTS

| | | |
|---|---|---|
| DE | 3538494 A1 | 5/1987 |
| DE | 4339191 A1 | 7/1994 |
| EP | 1211008 A2 | 6/2002 |
| JP | 56-9890 | 1/1981 |
| JP | 4-122520 A | 4/1992 |
| JP | 2003-205426 A | 7/2003 |
| TW | 504423 B | 10/2002 |

OTHER PUBLICATIONS

German Office Action dated Apr. 24, 2008.

* cited by examiner

*Primary Examiner*—Tu B Hoang
*Assistant Examiner*—Lindsey C Teaters
(74) *Attorney, Agent, or Firm*—Sughrue Mion, PLLC

(57) ABSTRACT

A power supply apparatus for an electric discharge machine configured to perform melt-removal on a workpiece by supplying pulse-like power to a machining gap between an electrode (1) and a workpiece (2). This power supply apparatus includes a second machining circuit configured to control a voltage to be applied to the machining gap and to cause a discharge in the machining gap, a first machining circuit adapted to operate to supply, when a discharge occurring in the machining gap in response to application of a voltage by the second machining circuit is detected in a first drive mode, a constant current to the machining gap, and also configured to operate to adapt a voltage source (14) in the second machining circuit to output a constant voltage in a second drive mode, and connection means (13) configured to close connection to a power supply (4) to supply electric power through the second machining circuit in the first mode and also configured to open the connection to the power supply (4) in the second mode so that the second machining circuit operates at a constant voltage supplied from the voltage source (14).

26 Claims, 8 Drawing Sheets

POWER SUPPLY APPARATUS FOR ELECTRIC DISCHARGE MACHINE AND POWER SUPPLY CONTROL METHOD

TECHNICAL FIELD

The present invention relates to a method of controlling power supply for an electric discharge machine configured to supply machining power between an electrode, which is provided in machining liquid or air, and a workpiece, and also relates to an apparatus therefor.

BACKGROUND ART

Electric discharge machines are operative to supply electric current pulses to a machining gap and to perform melt-removal and machining of workpieces by using discharge energy.

The conventional circuit configuration of a power supply apparatus therefor is disclosed in, for example, JP-UM-A-56-9890.

The power supply apparatus disclosed in this JP-UM-A-56-9890 has two modes of operations, which are a rough machining operation and a finish machining operation, as operations of this circuit. Between a circuit suited to the finish machining operation and a circuit suited to the rough machining operation is performed by changing over a switch. Switching elements respectively used in a charging circuit and a discharging circuit in the finish machining operation are utilized in a parallel circuit in the rough machining operation, and are thus effectively used. Consequently, the configuration of the power supply apparatus is compact and inexpensive.

Patent Document 1: JP-UM-A-56-9890 (pages 1 to 10, and FIG. 1)

DISCLOSURE OF THE INVENTION

Problems that the Invention is to Solve

A "pulsed power supply apparatus for an electric discharge machine" disclosed in JP-UM-A-56-9890 uses a direct-current voltage power supply as a power source.

This direct-current voltage power supply is usually configured so that a commercial alternating current power supply signal is rectified by a rectifier and is smoothed by a smoothing capacitor.

In the case of the direct-current voltage power supply of such a configuration, an voltage output serving as a direct-current voltage power supply varies in response to variation in voltage level of the commercial alternating current power supply signal.

Thus, in the case of a machining circuit of the type that uses a direct-current power supply and limits electric current, which can be supplied by a switching device, by the current capacity thereof like a rough machining circuit, when a direct current power voltage varies, an output current thereof varies, so that the same machining results cannot be obtained.

Further, in the case of a finish machining circuit, a circuit adapted to charge a capacitor C serves as a kind of a constant voltage circuit. This circuit is effective in a case where a desired voltage of the capacity C is lower than a voltage obtained by smoothing a commercial alternating current power supply signal. There are no problems in a case where an increasing variation of power supplied by the commercial alternating current power supply is caused. However, in a case where a decreasing variation of the power supplied by the commercial alternating current power supply is caused, the circuit adapted to increase the voltage of the capacitor C keeps charging the capacitor C indefinitely and is not changed to a discharge circuit. Thus, machining is not performed at all.

Even when the circuit is constrainedly changed to a discharge circuit, the distance between the electrode and the workpiece is controlled by a servo mechanism (not shown). Signals, on which this control is based, represent a voltage in a machining gap during discharging, and a voltage therein before discharging. In a case where the machining gap is controlled to be narrow to enhance the precision in transferring the shape of the electrode, similarly to the finish machining, a control error of the servo mechanism due to variation in voltage of the capacitor C is a factor of instability of machining, for example, a short circuit between the electrode and the workpiece. Consequently, there has occurred a problem in that the workpiece is not finished to have a desired surface roughness.

The invention is accomplished to solve the aforementioned problem. An object of the invention is to obtain a power supply for an electric discharge machine enabled to perform, when rough machining dealing with a large current is performed, the constant current control of a switching circuit and the supply of constant machining current pulses to a machining gap at all times, and also enabled to perform, in a case where a resistance type machining circuit operates when finish machining dealing with a small current is performed, the supply of a direct-current power supply voltage represented by constant electric pulses to the machining gap at all times even when a commercial voltage varies, to thereby stably perform finish machining, and also enabled to be constituted compactly and inexpensively.

Means for Solving the Problems

According to the invention, there is provided a power supply apparatus for an electric discharge machine configured to perform melt-removal on a workpiece by supplying pulse-like power to a machining gap between an electrode and the workpiece. This power supply apparatus includes a second machining circuit configured to control a voltage to be applied to the machining gap and to cause a discharge in the machining gap, a first machining circuit adapted to operate to supply, when a discharge occurring in the machining gap in response to application of a voltage by the second machining circuit is detected in a first drive mode, a constant current to the machining gap, and also configured to operate to adapt a voltage source in the second machining circuit to output a constant voltage in a second drive mode, and connection means configured to close connection to a power supply to supply electric power through the second machining circuit in the first mode and also configured to open the connection to the power supply in the second mode so that the second machining circuit operates at a constant voltage supplied from the voltage source.

That is, the invention features that a constant-current machining circuit used in the case of supplying a large current to the machining gap is used as a constant voltage power supply in the case of supplying a small current to the machining gap.

Advantages of the Invention

According to the invention, in the case of machining, such as the rough machining, using a large current, a constant-current control circuit is used. Thus, the machining can be performed at a constant current Further, in the case of machining, such as the finish machining, using a small current, the constant-current control circuit used in the rough machining is used as a constant voltage power supply used to perform constant voltage control. Thus, even in an instable case where the increasing or decreasing variation of a commercial power supply voltage occurs, the machining voltage and the machining current of the finish circuit can be made to be constant at all times, so that the finish machining time and the reproducibility of a machining surface roughness are favorable.

Additionally, there is no need for connecting a stabilized power supply, which is used to stabilize the commercial power supply, to an external portion of a power supply apparatus for an electric discharge machine. Consequently, the cost of the power supply therefor can be further reduced.

BEST MODE FOR CARRYING OUT THE INVENTION

First Embodiment

Figure 1:
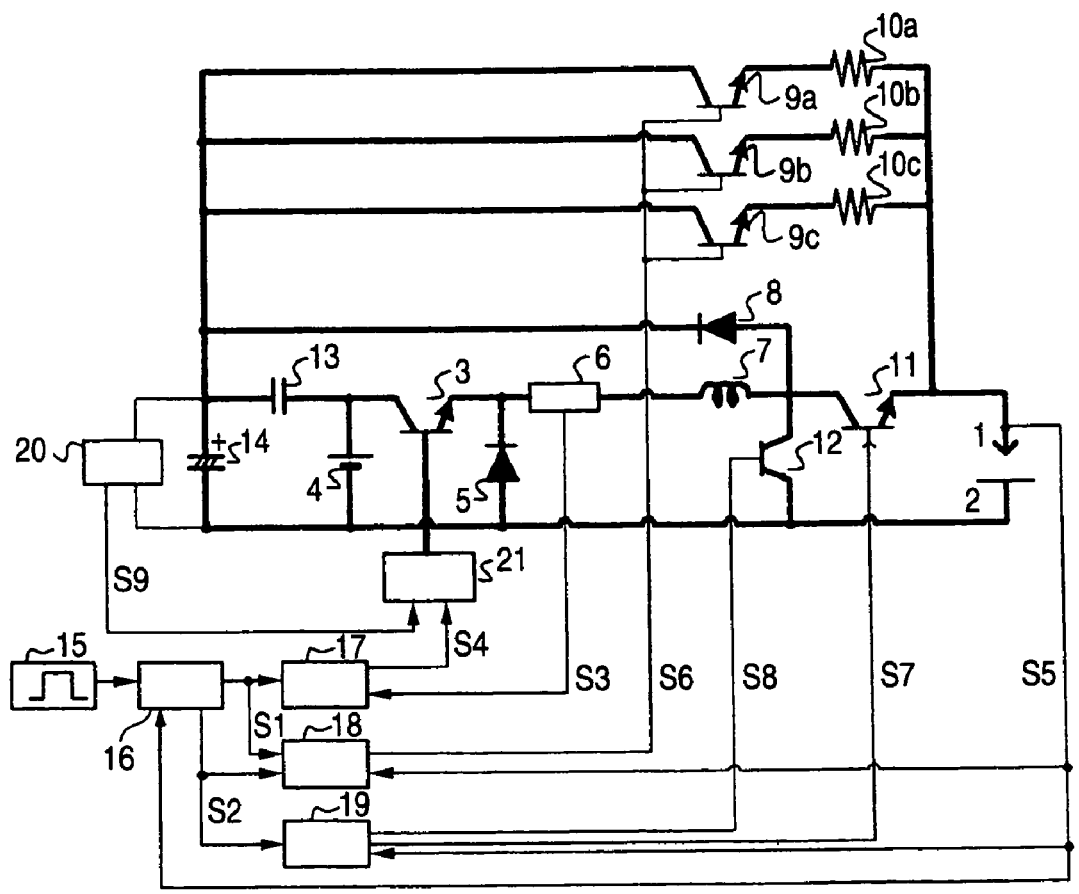
FIG. 1 is a diagram illustrating the configuration of a power supply apparatus for an electric discharge machine, which is a first embodiment of the invention.

FIG. 1 shows a circuit diagram of a power supply apparatus for an electric discharge machine, which is a first embodiment that carries out the invention.

In FIG. 1, reference numeral 1 designates an electrode, 2 denotes a workpiece to be machined, reference 3 designates a first switching element, reference numeral 4 denotes a direct-current power supply adapted to supply a direct-current power signal obtained by rectifying and smoothing a power signal supplied from a commercial power supply, reference numeral 5 designates a first diode, reference numeral 6 denotes an electric current detector, reference numeral 7 designates a reactor, reference numeral 8 denotes a second diode, reference numerals 9a to 9c designate second switching elements, reference numerals 10a to 10c denote electric current limiting resistors, the resistance ratio among which is 1:2:4 that is the ratio among factorials of 2, reference numeral 11 designates a third switching element, reference numeral 12 denotes a fourth switching element, reference numeral 13 designates contact points constituted by an electromagnetic switch, reference numeral 14 denotes a capacitor serving as a voltage source, reference numeral 15 designates an electric current command value signal setting apparatus, and reference numeral 16 denotes an electric current command value signal generating apparatus adapted to output an electric current command value signal S1 and a machining pulse signal S2.

Reference numeral 17 designates a first switch control means configured to compare a value represented by an electric current command value signal S1 and a present value represented by a detection signal S3 detected by the current detector 6, and also configured to output a drive signal S4 according to a result of the comparison to control the first switching element 3.

Reference numeral 18 denotes a second switch control means configured to output a drive signal S6 to apply a voltage between the electrode 1 and the workpiece 2 by driving the switching elements 9a to 9c according to an electric current command value signal S1, a machining pulse signal S2, and a discharge detection signal S5 outputted when a discharge occurs between the electrode 1 and the workpiece 2.

Reference numeral 19 designates a third switch control means configured to output timing signals S7 and S8, which are used to control the ON/Off of the third switching element 11 and the fourth switching element 12, in response to a machining pulse signal S2 and to a discharge detection signal S5.

Reference numeral 20 denotes a control means configured to detect the voltage value of the capacitor 14 and to output a PWM oscillation signal S9 to the selector 21 so as to change the voltage value of the capacitor 14 to a predetermined voltage value preliminarily set by an NC controller (not shown) or the like.

The selector 21 switch-selects the PWM oscillation signal S9, which is outputted by the control means 20, or the drive signal S4 outputted by the control means 17 according to a rough machining mode or a finish machining mode designated by the NC controller (not shown) before the machining is started. Also, the selector 21 outputs the selected signal as a signal used to perform the ON/OFF control of the switching element 3.

Incidentally, a first machining circuit includes an electric energy storage circuit in which the power supply 4, the first switching element 3, the electric current detector 6, the reactor 7, and the fourth switching element 12 are series-connected, and also includes the third switching element 11 adapted to supply an output electric current of this electric energy storage circuit to the machining gap as pulses, the first diode 5 connected thereto to maintain the electric current in the electric energy storage circuit, and the second diode 8 connected thereto to return, when the first switching element 3, the third switching element 11, and the fourth switching element 12 are turned off, electric current which remains in the reactor 7 of the electric energy storage circuit to the power supply 4 and the capacitor 14.

Further, a second machining circuit includes series-elements in each of which an associated one of the electric current limiting resistors 10a to 10c, the resistance ratio among which is 1:2:4 that is the ratio among factorials of 2, is series-connected to an associated one of the second switching elements 9a to 9c, and also includes the power supply 4 in a state in which the contact points 13 are closed. This second machining circuit is parallel-connected to the first machining circuit to apply a voltage to the machining gap between the electrode 1 and the workpiece 2.

Next, an operation of the circuit of the power supply apparatus is described below.

The operation of this circuit has two operation modes, that is, a first drive mode, in which rough machining requiring an electric current peak of tens amperes or more is performed, and a second drive mode in which finish machining requiring an electric current peak of several amperes or less is performed.

In the first operation mode that enables the rough machining, the first machining circuit serves as a constant current control circuit. The second machining circuit serves as a circuit that causes the dielectric breakdown of the machining gap.

Hereinafter, an operation of the circuit of the power supply apparatus in rough machining is described below in detail.

In the rough machining, in response to a command from the NC controller, the contact points 13 are closed. Also, the action of the selector 21 is selected to output the drive signal S4, which is outputted from the first switch control means 17, to the first switching element 3.

Before the start of the machining, an operator preliminarily sets the waveform of a machining current, the duration thereof, the quiescent time of the supply thereof, and so on in the electric current command value signal generating apparatus 16 by using the setting apparatus 15.

Incidentally, information on these conditions may be provided by programs from the NC controller, or the like.

The electric current command value signal generating apparatus 16 generates signals, such as a signal providing timing, with which a voltage is applied to the machining gap, which are necessary in actual machining for the power supply apparatus, according to the conditions set by the setting apparatus 15.

That is, the electric current command value signal generating apparatus 16 outputs a machining pulse signal S2 that prescribes the following operation. When a discharge is started after the voltage is applied to the machining gap, a machining current waveform having a constant machining duration is outputted. When the machining duration is terminated, a constant quiescent time is provided. Thereafter, a voltage is again applied thereto.

The machining pulse signal S2 is adapted to have a signal level H in a no-load time during which the voltage is applied to the machining gap and which no electric discharge occurs. In a case where an electric discharge is detected as indicated by a discharge detection signal S5, the machining pulse signal S2 has the signal level H during a machining duration, and also ahs a signal level L during a quiescent time.

The electric current command value signal generating apparatus 16 is also adapted to generate an electric current command value signal S1 indicating how much the machining current is supplied to the machining gap.

The control of the first machining circuit is performed by the first switch control means 17 and the third switch control means 19 as follows.

The first switch control means 17 obtains the electric current value of electric current, which currently flows in the first machining circuit, from a detection signal S3 outputted by the current detector 6. In a case where the electric current value represented by the current detection signal S3 is less than the value indicated by the current command value signal S1, the first switch control means 17 turns on the first switching element 3 through the selector 21. In a case where the electric current value indicated by the current detection signal S3 reaches the value indicated by the current command value signal S1, the first switch control means 17 turns off the first switching element 3 for a certain time through the selector 21 to thereby reduce the electric current value of electric current, which flows through the first machining circuit, to be smaller than the value indicated by the current command value signal S1. Such an operation is repeated. Thus, the electric current value of electric current detector 6 is controlled to be constant.

In a case where the machining pulse signal S2 has the level L (a quiescent time), or in a case where the machining pulse signal S2 has the level H and where it is detected from the discharge detection signal S5 that no electric discharge occurs (a no-load time), the third switch control means 19 turns off the third switching element 11, and turns on the fourth switching element 12 to thereby maintain electric current to be supplied in the electric energy storage circuit during the next discharge time.

In a case where the machining pulse signal S2 has the level H and where it is detected from the discharge detection signal S5 that an electric discharge occurs (a discharge time), that is, in a case where the dielectric breakdown of the machining gap is performed by the second machining circuit, the third switch control means 19 turns on the third switching element 11, and turns off the fourth switching element 12 to thereby cause the first machining circuit to supply a constant electric current to the machining gap only during a discharge duration.

That is, regardless of whether or not electric current is supplied to the machining gap, the first switch control means 17 and the third switch control means 19 cause the first machining circuit to serve as a constant current control circuit in which a constant current always flows in the electric energy storage circuit.

Regarding the control of the second circuit, in a case s where the machining pulse signal S2 has the signal level H, the second switching elements 9a to 9c are turned on by the second switch control means 18. Thus, the second machining circuit applies a voltage to the machining gap to thereby cause an electric discharge in the machining gap.

At that time, no electric discharge occurs in the machining gap. Thus, no electric discharge is detected according to the discharge detection signal S5.

When an electric discharge occurs in the machining gap, the second switch control means 18 detects the start of an electric discharge according to the discharge detection signal S5 and turns off the second switching elements 9a to 9c.

Incidentally, in this embodiment, the electric current flowing in the machining gap is controlled by turning off the second switching elements 9 so that this electric current is a constant current flowing from the first machining circuit. However, in a case where the value of electric current supplied from the second machining circuit is very low and does not contributed to the discharge machining, the second switching elements may be maintained in an ON-state.

Further, in a case where the machining pulse signal S2 has the level L (a quiescent time), the control means 18 turns off the second switching elements 9a to 9c in the second machining circuit.

The operations of the first machining circuit and the second machining circuit, which are controlled by the first control means 17, the second control means 18, and the third control means 19, are described below in the order of the following phases "1. Quiescent Time", "2. No-Load Time", and "3. Electric Discharge Duration".

1. Quiescent Time

The machining pulse signal S2 has the level L. The second switching circuit elements 9a to 9c are turned off by the second switch control means 18.

Further, in the first machining circuit, the third switching element 11 and the fourth switching element 12 are turned off and on, respectively, by the third switch control means 19.

The first switch control means 17 detects electric current flowing in the first machining circuit and performs the ON/OFF-control of the first switching element 3 to always maintain the electric current flowing in the first machining circuit at a constant level.

Needless to say, the electric current flowing in the first machining circuit at that time is not supplied to the machining gap, because the third switching element 11 is turned off.

2. No-Load Time

The machining pulse signal S2 has the level H. The discharge detection signal S5 is in a state in which no discharge is detected.

At that time, the second switching elements 9a to 9c are turned on by the second switching means 18 to cause an electric discharge in the machining gap. Thus, the second machining circuit applies a voltage to the machining gap.

On the other hand, the first machining circuit is in a state in which the third switching element 11 is turned off, similarly to the quiescent time. Thus, the first machining circuit is controlled so that the electric current therein is always constant, so that no electric current is supplied therefrom to the machining gap.

3. Electric Discharge Duration

The apparatus is in a state in which the machining pulse signal S2 has the level H, and in which an electric discharge is detected according to the discharge detection signal S5.

At that time, in the second machining circuit, the second switching elements 9a to 9c are turned off by the second switch control means 18. Thus, the application of the voltage to the machining gap is finished.

In the first machining circuit, at a moment when an electric discharge is detected according to the discharge detection signal S5, the third switch control means 19 turns on the third switching element 11 and turns off the fourth switching element 12 to thereby change the state in which electric current is supplied to the machining gap.

The value of the electric current supplied from this first machining circuit is maintained at a constant value, which is the value designated by the electric current command value signal S1, even during the discharge duration by performing the ON/OFF control of the first switching element 3 by means of the first switch control means 17.

Incidentally, in a minute time (about 1 microsecond maximum) from a moment, at which an electric discharge is detected according to the discharge detection signal S5, to a moment, at which the second machining circuit stops the application of a voltage to the machining gap, an electric current of several amperes is supplied to the machining gap from the second machining circuit. However, because an electric current supplied from the first machining circuit is a large current of tens amperes, the influence of the electric current supplied from the second machining circuit is ignorable.

After the discharge duration is expired, the operation returns to the phase "1. Quiescent Time". Thus, the rough machining is performed by repeating the phases "1. Quiescent Time", "2. No-Load Time", and "3. Electric Discharge Duration".

In the discharge duration, according to some ON/OFF cycle of the first switching element 3 and to some constant of the reactor 7, the machining current supplied from the first machining circuit to the machining gap may include a large ripple.

In such a case, the electric current value of an electric current presently flowing in the first machining circuit, which value is obtained from the detection signal S3 outputted by the current detector 6, is inputted to the second switch control means 18, instead of keeping turning off the second switching elements. Then, the difference between the inputted electric current value and the value represented by the electric current command value signal S1 is computed. An electric current, whose electric current value is equal to this difference, is supplied from the second machining circuit to the machining gap as a machining current to thereby compensate the machining current, which is supplied from the first machining circuit, for the ripple component. Consequently, the machining current, whose electric current value is exactly equal to the electric current command value, can be supplied to the machining gap.

As described above, in the rough machining in the first operation mode, the apparatus uses the constant current power supply of the switching type adapted to detect the electric current always flowing in the first machining circuit by using the detector 6, and adapted to control the electric current, which flows therein, to always have a constant electric current value. Thus, even when a commercial power supply varies, the machining current, whose electric current value is exactly equal to the electric current command value, can be supplied to the machining gap.

Therefore, in a favorable machining time of the rough machining, a result of the machining can be obtained with good reproducibility of a machining surface roughness.

Also, the machining can be performed independent of variation in the commercial power supply. This eliminates the necessity for an auxiliary power supply adapted to stabilize the commercial power supply.

The second operation mode is adapted to realize the finish machining, which needs an electric current peak of several amperes or less, in the discharge machining. It is assumed that the machining is performed with a machining surface roughness of several μm to μm or less.

In this case, the second machining circuit including the capacitor 14, the electric current limiting resistors 10a to 10c, and the second switching elements 9a to 9c is adapted to perform the dielectric breakdown of the machining gap and to supply the machining current, differently from the first operation mode. The first machining circuit does not contribute directly to the machining, but serves as a constant voltage power supply adapted to supply a constant power supply voltage to the second machining circuit even when the commercial power supply performs an increasing variation.

In the following description, it is assumed that the first machining circuit operates as a constant voltage power supply of the step-down chopper type, which is what is generally known as the PWM control type, in the present embodiment.

Hereinafter, an operation of the circuit of the power supply apparatus in the finish machining is described in detail.

When the finish machining is performed, the contact points 13 are opened in response to a command issued by the NC controller. The action of the selector 21 is selected to output an output PWM oscillation signal S9 of the control means 20 to the first switching element 3.

That is, the first switch control means 17 does not contribute to the operation in the finish machining at all.

Also, similarly, in response to a command issued from the NC controller, the third switch control means 19 always turns off the third switching element 11 and the fourth switching element 12 in the first machining circuit and separates the first machining circuit from the machining gap.

The first machining circuit at that time is constituted as what is called a step-down chopper circuit including the power supply 4, the first switching element 3, the first diode 5, and the reactor 7.

Regardless of the machining phase, the no-load phase, and the quiescent phase, the control means 20 directly detects the voltage of the capacitor 14 and generates the PWM oscillation signal S9. The first machining circuit functions as a step-down chopper in response to the ON/OFF of the first switching element 3. Even when the voltage increasing variation of the commercial power supply occurred, the control means 20 controls the voltage of the capacitor 14 to be equal to the voltage value preliminarily set by the NC controller.

The constant voltage power supply of the step-down chopper type is effective in a case where an input voltage (a commercial power supply voltage in this case) is equal to or higher than a desired voltage (a voltage outputted by the first machining circuit). It is known that the relation between the input voltage and the desired voltage is given by the following equation:

$$V_o = (T_{on}/(T_{on}+T_{off})) \cdot V_i \qquad (1)$$

where $V_o$ designates the desired voltage, $V_i$ denotes the input voltage, $T_{on}$ designates an on-time in which the first switching element 3 is on, and $T_{off}$ denotes an off-time in which the first switching element 3 is off.

That is, in a case where the input voltage rises with respect to the desired voltage, the time $T_{on}$ and the time $T_{off}$ are controlled so that the time $T_{on}$ is decreased, and that the time $T_{off}$ is increased. Thus, a desired constant voltage value can be obtained. Needless to say, in a case where the input voltage $V_i$ is equal to the desired voltage $V_o$, it is advisable to control the circuit so that $T_{off}=0$, that is, the first switching element 3 is always on.

The on-time $T_{on}$ and the off-time $T_{off}$ of this first switching element 3 are controlled according to the PWM oscillation signal, which is an ON/OFF signal having a constant period and is outputted so that the duty ratio between the ON-time and the OFF-time is adjusted by the control means 20.

The second machining circuit operates as a finish machining circuit using the capacitor 14, the voltage of which is controlled to be a constant voltage at all times, as the power supply.

Similarly to the first operation mode, before the start of the machining, an operator preliminarily sets the waveform of a machining current, the duration thereof, the quiescent time of the supply thereof, and so on in the electric current command value signal generating apparatus 16 by using the setting apparatus 15. The electric current command value signal generating apparatus 16 outputs the electric current command value signal S1 and the machining pulse signal S2. In a case where the machining pulse signal S2 has the level H, the second switch control means 18 turns on the second switching elements 9a to 9c in the second machining circuit so that electric current supplied from the turned-on second switching elements is equal to the electric current value designated by the electric current command value signal S1, and applies the voltage to the machining gap to thereby perform the dielectric breakdown. The second machining circuit supplies the machining current to the machining gap during a machining duration.

The operations of the control means 18 and the first machining circuit are described below in the order of the following phases of the electric discharge machining, that is, "1. Quiescent Time", "2. No-Load Time", and "3. Electric Discharge Duration".

1. Quiescent Time

The signal level of the machining pulse signal S2 is L. The control means 18 turns off the second switching elements 9a to 9c, so that the first machining circuit does not apply a voltage to the machining gap.

2. No-Load Time

The machining pulse signal S2 has the level H. The discharge detection signal S5 is in a state in which no discharge is detected.

The second switching elements 9a to 9c are turned on by the second switch control means 18. Thus, the first machining circuit applies the voltage to the machining gap.

At that time, the second switch control means 18 turns on the second switching elements 9a to 9c so that electric current supplied from the turned-on second switching elements is equal to the electric current value designated by the electric current command value signal S1. For example, in a case where an electric current of 0.5 A can be supplied to the machining gap at the dielectric breakdown by turning on the second switching element 9a, where an electric current of 1 A can be supplied thereto by turning on the second switching element 9b, where an electric current of 2 A can be supplied thereto by turning on the second switching element 9c, and where the value designated by the electric current command value signal S1 is 1.5 A, the control means 18 turns on the second switching elements 9a and 9b.

3. Electric Discharge Duration

The apparatus is in a state in which the machining pulse signal S2 has the level H, and in which an electric discharge is detected according to the discharge detection signal S5.

At that time, the control means 18 turns on the second switching elements 9a to 9c so that electric current supplied from the turned-on second switching elements is equal to the value designated by the electric current command value signal S1, in the same manner in which the control means 18 controls during the no-load time. Thus, the first machining circuit supplies a machining current, the electric current value of which is equal to the electric current command value during the machining duration.

After the discharge duration is expired, the operation returns to the phase "1. Quiescent Time". Thus, the finish machining is performed by repeating the phases "1. Quiescent Time", "2. No-Load Time", and "3. Electric Discharge Duration".

As described above, the constant current power supply of the switching type used in the rough machining is used as a constant voltage power supply of the step-down chopper type, that is, a voltage source for the finish machining circuit in the finish machining that is in the second operation mode. Thus, even when the commercial power supply voltage performs an increasing variation, the machining voltage and the machining current of the finish machining can be set to be always constant. The machining time of the finish machining is favorable. The reproducibility of the machining surface roughness is good.

Further, the machining can be performed independent of the increasing variation of the commercial power supply. This eliminates the necessity for an auxiliary power supply adapted to stabilize the commercial power supply.

As described above, in the power supply apparatus according to the first embodiment for an electric discharge machine, the power supply of the constant current type can be changed to and utilized as the constant voltage power supply of the step-down chopper type. Thus, in the case of the rough machining that needs a large current, this embodiment serves a constant current power supply and can make the machining current constant. In the case where a minute electric current is needed, this embodiment serves as a constant voltage power supply for the separately provided finish machining circuit and can make the machining voltage and the machining current constant even when the commercial power supply voltage rises. Also, this embodiment can improve the reproducibility in the machining. Meanwhile, although the commercial power supply voltage varies in a place at which electric power conditions are poor, usually, it is necessary to connect a stabilizing power supply to the exterior of the power supply apparatus for an electric discharge machine thereby to stabilize the machining, this embodiment eliminate the necessity for additionally preparing a stabilizing power supply in a case where the commercial power supply voltage performs an increasing variation. Consequently, further reduction in the price of the power supply apparatus can be realized.

Second Embodiment

Figure 2:
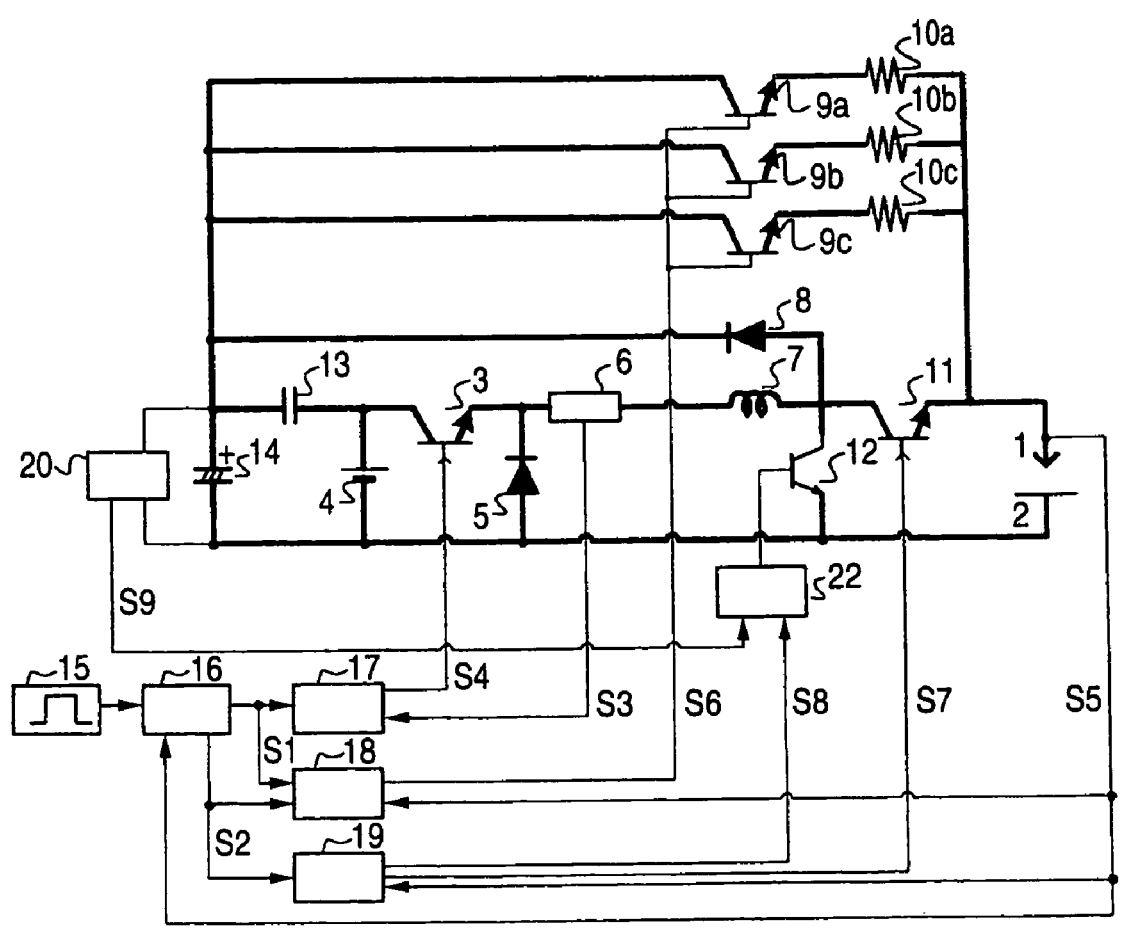
FIG. 2 is a diagram illustrating the configuration of a power supply apparatus for an electric discharge machine, which is a second embodiment of the invention.

FIG. 2 is a circuit diagram illustrating the configuration of a power supply apparatus for an electric discharge machine, which is a second embodiment of the invention.

This embodiment is constituted by removing the selector 21 from the first embodiment and adding a selector 22 to use the first machining circuit as a constant voltage power supply that is effective in a case where the commercial power supply voltage performs a decreasing variation.

The selector 22 switch-selects the PWM oscillation signal S9, which is outputted by the control means 20, or the drive signal S8 outputted by the third switch control means 19 according to a rough machining mode or a finish machining mode designated by the NC controller (not shown) before the machining is started. Also, the selector 22 outputs the selected signal as a signal used to perform the ON/OFF control of the fourth switching element 12.

The other constituents of the second embodiment are similar to the corresponding constituents of the first embodiment.

Next, an operation of the circuit of this power supply apparatus is described below.

The operation of this circuit has two operation modes, that is, a first drive mode, in which rough machining requiring an electric current peak of tens amperes or more is performed, and a second drive mode, in which finish machining requiring an electric current peak of several amperes or less and being assumed to provide a machining surface roughness of several μm to 1 μm or less is performed.

Incidentally, this embodiment is similar to the first embodiment in that the first machining circuit serves as a constant current control circuit, and that the second machining circuit serves as a circuit adapted to perform the dielectric breakdown of the machining gap.

In the first drive mode in which the rough machining is performed, the contact points 13 are closed by the NC controller. Also, the action of the selector 22 is controlled to be selected to output an output signal S8 of the third switch control means 19 to the fourth switching element 12. An operation in the rough machining is similar to that in the rough machining in the first embodiment.

On the other hand, the second operation mode, in which the finish machining is performed, differs from the first operation mode in that the second machining circuit is adapted to perform the dielectric breakdown of the machining gap and to supply the machining current, and in that the first machining circuit does not contribute directly to the machining, but serves as a constant voltage power supply adapted to supply a constant power supply voltage to the second machining circuit even when the commercial power supply performs a decreasing variation.

In the following description, it is assumed that the first machining circuit operates as a constant voltage power supply of the step-down chopper type, which is what is generally known as the PWM control type, in the present embodiment.

Hereinafter, an operation of the circuit of the power supply apparatus in the finish machining is described in detail.

When the finish machining is performed, the contact points 13 are opened in response to a command issued by the NC controller. The action of the selector 22 is selected to output an output PWM oscillation signal S9 of the control means 20 to the fourth switching element 12.

Also, similarly, in response to a command issued from the NC controller, the first switch control means 17 always turns off the first switching element 3.

Similarly, in response to a command issued from the NC controller, the third switch control means 19 always turns off the third switching element 11 and separates the first machining circuit from the machining gap.

The first machining circuit at that time is constituted as what is called a step-up chopper circuit including the power supply 4, the first switching element 3 (always turned on), the reactor 7, the fourth switching element 12, and the second diode 8.

Regardless of the machining phase, the no-load phase, and the quiescent phase, the control means 20 directly detects the voltage of the capacitor 14 and generates the PWM oscillation signal S9. The first machining circuit functions as a step-up chopper in response to the ON/OFF of the fourth switching element 12. Even when the voltage decreasing variation of the commercial power supply voltage occurred, the control means 20 controls the voltage of the capacitor 14 to be equal to the voltage value preliminarily set by the NC controller.

The constant voltage power supply of the step-up chopper type is effective in a case where an input voltage (a commercial power supply voltage in this case) is equal to or lower than a desired voltage (a voltage outputted by the first machining circuit). It is known that the relation between the input voltage and the desired voltage is given by the following equation:

$$V_o = ((T_{on} + T_{off})/T_{on}) \cdot V_i \qquad (2)$$

where $V_o$ designates the desired voltage, $V_i$ denotes the input voltage, $T_{on}$ designates an on-time in which the fourth switching element 12 is on, and $T_{off}$ denotes an off-time in which the fourth switching element 24 is off.

That is, in a case where the input voltage drops with respect to the desired voltage, the time $T_{on}$ and the time $T_{off}$ are controlled so that the time $T_{on}$ is increased, and that the time $T_{off}$ is decreased. Thus, a desired constant voltage value can be obtained. Needless to say, in a case where the input voltage $V_i$ is equal to the desired voltage $V_o$, it is advisable to control the circuit so that $T_{on}=0$, that is, the fourth switching element 12 is always off.

The on-time $T_{on}$ and the off-time $T_{off}$ of the fourth switching element 12 are controlled according to the PWM oscillation signal, which is an ON/OFF signal having a constant period and is outputted so that the duty ratio between the ON-time and the OFF-time is adjusted by the control means 20.

The second embodiment is similar to the aforementioned first embodiment in that the second machining circuit operates as a finish machining circuit using the capacitor 14, the voltage of which is controlled to be a constant voltage at all times, as the power supply.

As described above, the power supply apparatus according to the second embodiment for an electric discharge machine uses the power supply of the constant current type, which is of the switching type. Thus, in the case of the rough machining that needs a large current, even when the commercial power supply voltage varies, the machining current is always constant. The machining time of the rough machining is favorable. The reproducibility of the rough machining surface roughness is good.

This constant current power supply of the switching type is used as a constant voltage power supply of the step-up chopper type, that is, a voltage source for the finish machining circuit in the finish machining. Thus, even when the commercial power supply voltage performs a decreasing variation, the machining voltage and the machining current of the finish machining can be set to be always constant. The machining time of the finish machining is favorable. The reproducibility of the machining surface roughness is good.

Further, although the commercial power supply voltage varies in a place at which electric power conditions are poor, usually, it is necessary to connect a stabilizing power supply to the exterior of the power supply apparatus for an electric discharge machine thereby to stabilize the machining, this embodiment eliminate the necessity for additionally preparing a stabilizing power supply in a case where the commercial power supply voltage performs a decreasing variation. Consequently, further reduction in the price of the power supply apparatus can be realized.

Third Embodiment

Figure 3:
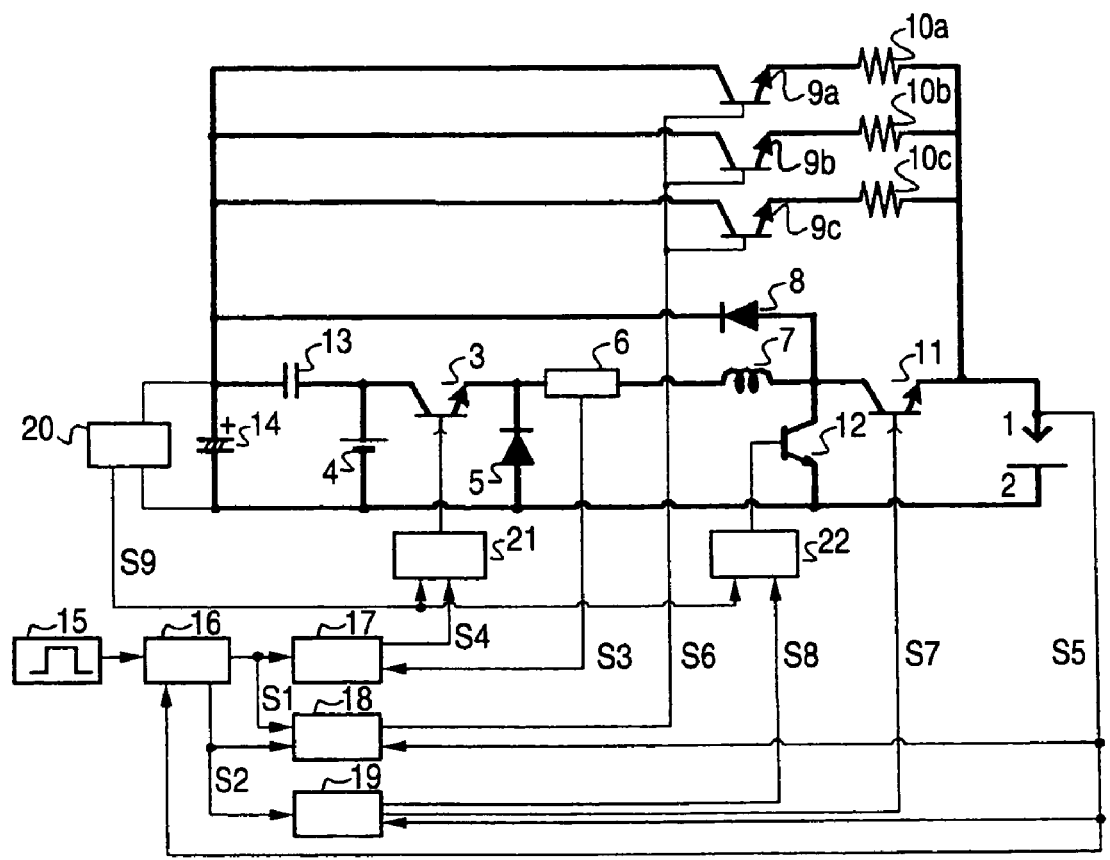
FIG. 3 is a diagram illustrating the configuration of a power supply apparatus for an electric discharge machine, which is each of third and fourth embodiments of the invention.

FIG. 3 is a circuit diagram illustrating the configuration of a power supply apparatus for an electric discharge machine, which is a third embodiment of the invention.

This embodiment is constituted by adding a selector 22 to the first embodiment so that the power supply apparatus can be used as an effective constant voltage source in a case where the commercial power supply voltage performs a decreasing variation, similarly to the first embodiment, and that the power supply apparatus can be also used as an effective constant voltage source in a case where the commercial power supply voltage performs an increasing variation.

The selector 22 switch-selects the PWM oscillation signal S9, which is outputted by the control means 20, or the signal S8 outputted by the control means 19 according to a rough machining mode or a finish machining mode designated by the NC controller (not shown) before the machining is started. Also, the selector 22 outputs the selected signal as a signal used to perform the ON/OFF control of the fourth switching element 12.

The other constituents of the second embodiment are similar to the corresponding constituents of the first embodiment.

Next, an operation of the circuit of this power supply apparatus is described below.

The operation of this circuit has two operation modes, that is, a first drive mode, in which rough machining requiring an electric current peak of tens amperes or more is performed, and a second drive mode, in which finish machining requiring an electric current peak of several amperes or less and being assumed to provide a machining surface roughness of several μm to 1 μm or less is performed.

In the first operation mode enabling the rough machining, the first machining circuit serves as a constant current control circuit, while the second machining circuit serves as a circuit adapted to perform the dielectric breakdown of the machining gap, similarly to the first embodiment.

In the first drive mode in which the rough machining is performed, the contact points 13 are closed by the NC controller. The action of the selector 21 is selected to output an output signal S4 of the first switch control means 17 to the first switching element 3. Also, the action of the selector 22 is controlled to be selected to output an output signal S8 of the third switch control means 19 to the fourth switching element 12. An operation in the rough machining is similar to that in the rough machining in the first embodiment.

On the other hand, the second operation mode, in which the finish machining is performed, differs from the first operation mode in that the second machining circuit is adapted to perform the dielectric breakdown of the machining gap and to supply the machining current, and in that the first machining circuit does not contribute directly to the machining, but serves as a constant voltage power supply adapted to supply a constant power supply voltage to the second machining circuit even when the commercial power supply performs an increasing/decreasing variation.

In the following description, it is assumed that the first machining circuit operates as a constant voltage power supply of the step-up/step-down chopper type, which is what is generally known as the PWM control type, in the present embodiment.

Hereinafter, an operation of the circuit of the power supply apparatus in the finish machining is described in detail.

When the finish machining is performed, the contact points 13 are opened in response to a command issued by the NC controller. The action of the selector 21 and the action of the selector 22 are selected to output an output PWM oscillation signal S9 of the control means 20 to the first switching element 3 and the fourth switching element 12, respectively.

That is, the first switching element 3 and the fourth switching element 12 are controlled in response to the PWM oscillation signal S9 outputted from the control means 20 to perform simultaneous ON/OFF operations.

Similarly, in response to a command issued from the NC controller, the third switch control means 19 always turns off the third switching element 11 and separates the first machining circuit from the machining gap.

The first machining circuit at that time is constituted as a circuit that serves both as what is called a step-up chopper circuit and what is called a step-down chopper circuit. The first machining circuit includes the power supply 4, the first switching element 3, the first diode 5, the reactor 7, the fourth switching element 12, and the second diode 8.

Regardless of the machining phase, the no-load phase, and the quiescent phase, the control means 20 directly detects the voltage of the capacitor 14 and generates the PWM oscillation signal S9. The first machining circuit and the second machining circuit function as a step-up chopper and a step-down chopper in response to the simultaneous ON/OFF of the first switching element 3 and the fourth switching element 12, respectively. Even when the voltage decreasing variation and the voltage decreasing variation of the commercial power supply voltage occurred, the voltage of the capacitor 14 is made to be equal to the voltage value preliminarily set by the NC controller.

The constant voltage power supply having both functions of the power supply of the step-up chopper type and the power supply of the step-down type is effective in all cases where an input voltage (a commercial power supply voltage in this case) is lower than a desired voltage (a voltage outputted by the first machining circuit), where the input voltage is higher than the desired voltage, and where the input voltage is equal to the desired voltage. It is known that the relation between the input voltage and the desired voltage is given by the following equation:

$$V_o = (T_{on}/T_{off}) \cdot V_i \qquad (3)$$

where $V_o$ designates the desired voltage, $V_i$ denotes the input voltage, $T_{on}$ designates an on-time in which the first switching element 3 and the fourth switching element 12 are on, and $T_{off}$ denotes an off-time in which the first switching element 3 and the fourth switching element 12 are off.

That is, in a case where the input voltage drops with respect to the desired voltage, the time $T_{on}$ and the time $T_{off}$ are controlled so that the time $T_{on}$ is increased, and that the time $T_{off}$ is decreased. Thus, a desired constant voltage value can be obtained. Further, conversely, in a case where the input voltage rises with respect to the desired voltage, the time $T_{on}$ and the time $T_{off}$ are controlled so that the time $T_{on}$ is decreased, and that the time $T_{off}$ is increased. Thus, the desired constant voltage value can be obtained. In a case where the input voltage $V_i$ is equal to the desired voltage $V_o$, it is advisable to control the circuit so that $T_{on} = T_{off}$, that is, the on-time of the first switching element 3 and the fourth switching element 12 is equal to the off-time of the first switching element 3 and the fourth switching element 12.

The on-time $T_{on}$ and the off-time $T_{off}$ of the first switching element 3 and the fourth switching element 12 are controlled according to the PWM oscillation signal, which is an ON/OFF signal having a constant period and is outputted so that the duty ratio between the ON-time and the OFF-time is adjusted by the control means 20.

The second embodiment is similar to the aforementioned first embodiment in that the second machining circuit operates as a finish machining circuit using the capacitor 14, the voltage of which is controlled to be a constant voltage at all times, as the power supply.

As described above, the power supply apparatus according to the third embodiment for an electric discharge machine uses the power supply of the constant current type, which is of the switching type. Thus, in the case of the rough machining that needs a large current, even when the commercial power supply voltage varies, the machining current is always constant. Thus, the machining time of the rough machining is favorable. The reproducibility of the rough machining surface roughness is good.

This constant current power supply of the switching type is used as a constant voltage power supply of the chopper type that can step-up and step-down, that is, a voltage source for the finish machining circuit in the finish machining. Thus, even when the commercial power supply voltage is in an unstable state in which the commercial power supply voltage performs an increasing variation and a decreasing variation, the machining voltage and the machining current of the finish machining can be made to be always constant. The machining time of the finish machining is favorable. The reproducibility of the machining surface roughness is good.

Further, the commercial power supply voltage sharply varies up and down in a place at which electric power conditions are poor. For example, the commercial power supply voltage is low in daytime, while the voltage is high at night. Thus, unless a stabilizing power supply is connected to the exterior of the power supply apparatus for an electric discharge machine, the process of machining is not stable. The reproducibility of a result of machining is poor. Furthermore, in a case where the stabilizing power supply is provided separately from the power supply apparatus, the cost of the apparatus is increased by that much. However, the present embodiment incorporates the function of the stabilizing power supply therein and does not need the provision of the stabilizing power supply at all. Consequently, the cost of the apparatus can be reduced. Simultaneously, the space-saving thereof can be achieved.

Fourth Embodiment

The present embodiment is configured so that a voltage command value is sent from the NC controller (not shown) to the controller 20 of the circuit of the third embodiment shown in FIG. 3 to make a target voltage value of the capacitor 14 variable.

An operation of the circuit of this power supply apparatus has two operation modes. One of these operation modes is a first mode, in which rough machining is performed, and is similar to the first operation mode of the third embodiment.

In a second operation mode at the finish machining, basically, an operation similar to the associated operation of the third embodiment is performed. However, because the voltage of the capacitor 14 can freely be changed, the finishing current value, which is determined by the voltage of the capacitor 14 and the electric current limiting resistors 10a to 10c, the resistance ratio among which is 1:2:4 that is the ratio among factorials of 2, can freely and more finely be set.

For instance, in a case where the finishing currents determined by the voltage of the capacitor 14 and the current limiting resistors 10a to 10c are 0.5 A, 1 A, and 2 A, respectively, in the third embodiment, electric current values other than those of this set cannot be used as the value of the machining current. Therefore, in a case where fine finish machining is performed (for example, an electric current of 0.25 A is needed), additional electric current limiting resistors and additional switching elements are needed. Thus, the size and the cost of the power supply apparatus are increased.

Further, in a case where a power source, such as a direct-current voltage power supply 4, adapted to obtain a direct-current voltage by rectifying and smoothing a commercial alternating current power supply voltage is used as the power supply for the second machining circuit, additional transformers of the number equal to the number of notches corresponding to voltage levels, among which the voltage is changed, are needed. Consequently, the size and the cost of the power supply apparatus are also increased.

However, according to the present embodiment, the voltage of the capacitor 14 can be changed in response to a command to the control means 20 from the NC controller or the like. Thus, the finished surface roughness can be improved. Also, the electric discharge machine can deal with fine machining.

Further, the voltage of the capacitor 14 is a no-load voltage at the machining. The dielectric breakdown distance between the electrode and the workpiece is determined by the value of this voltage. Generally, the higher the no-load voltage, the larger the dielectric breakdown distance. Also, the lower the no-load voltage, the narrower the dielectric breakdown distance.

The narrower the dielectric breakdown distance, the precision of transfer of the shape of the electrode to the workpiece is enhanced. The larger the dielectric breakdown distance, the exhaustion of machining chips is accelerated, so that the machining speed is increased. Therefore, the more posterior the stage of which the machining conditions are set in the finish machining, the smaller the value of the voltage of the capacitor 14 is set. Consequently, the finish-machining speed and the finish-machining precision can extremely be enhanced.

Fifth Embodiment

This embodiment is configured by adding a temperature detection means, which is adapted to detect the temperature of the switching element, to the circuit of the third embodiment.

Figure 4:
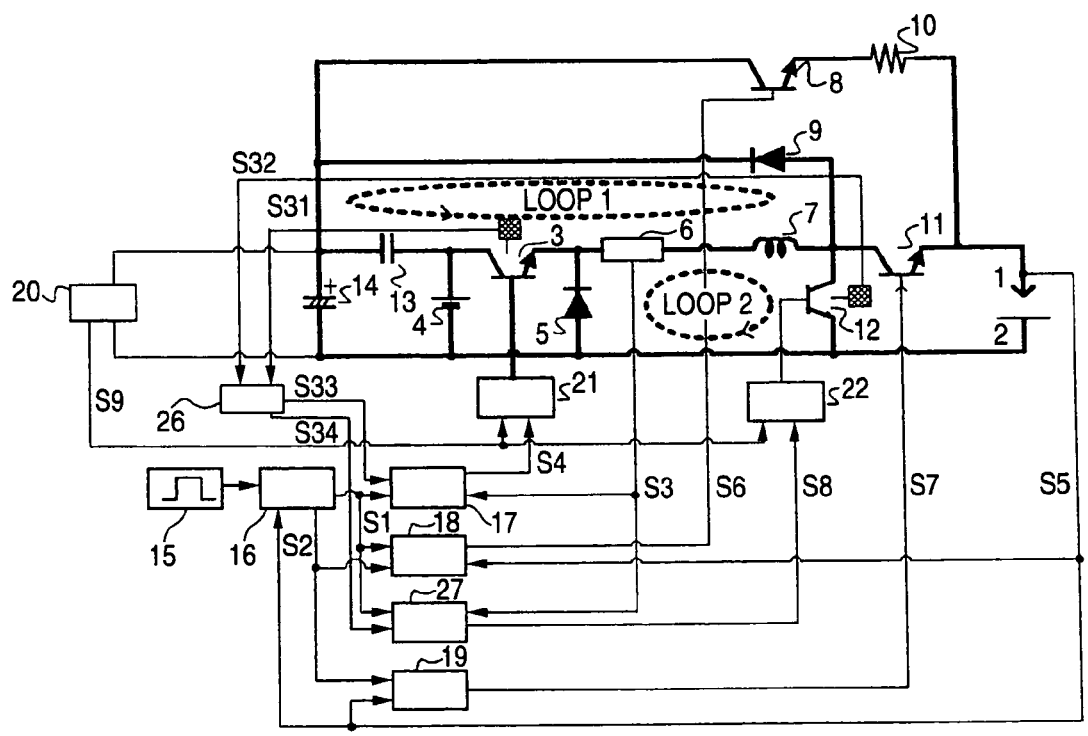
FIG. 4 is a diagram illustrating the configuration of a power supply apparatus for an electric discharge machine, which is a fifth embodiment of the invention.

FIG. 4 is a circuit diagram illustrating the configuration of a power supply apparatus for an electric discharge machine, which is the fifth embodiment of the invention.

Figure 5:
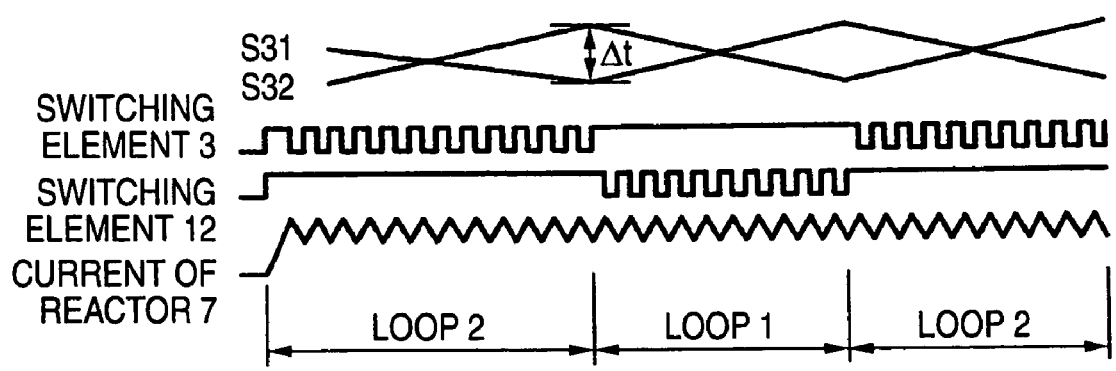
FIG. 5 is a timing chart illustrating the power supply apparatus for an electric discharge machine, which is the fifth embodiment of the invention.

FIG. 5 is a timing chart illustrating the power supply apparatus for an electric discharge machine, which is the fifth embodiment adapted to implement the invention.

In FIG. 4, reference numeral 26 designates a feedback loop switching signal generating apparatus adapted to make comparison between the value indicated by a temperature detection signal S31, which represents the temperature of the switching element 3, and the value indicated by a temperature detection signal S32, which represents the temperature of the switching element 12, and also adapted to output feedback loop switching signals S33 and S34 according to results of the comparison. Reference numeral 27 denotes a switch control means adapted to make comparison between the value indicated by the electric current command value signal S1 and the present value indicated by the detection signal S3, which is detected by the electric current detector 6, and also adapted to output a drive signal S8 according to a result of the comparison to control the switching element 12. The other constituents of the fifth embodiment are similar to the corresponding constituents of the third embodiment.

The fifth embodiment performs the switching control of an electric current maintenance circuit (or feedback loop) for machining current, the constant current control of which is performed. Hereinafter, only the difference between an operation of the fifth embodiment and that of the first embodiment is described below.

For convenience of description, a closed circuit including the switching element 3, the electric current detector 6, the reactor 7, the diode 8, and the contact points 13 is called a "loop 1". Also, a closed circuit including the switching element 12, the diode 5, the electric current detector 6, and the reactor 7 is called a "loop 2".

In the first operation mode, the temperature detection means detects the temperatures of the switching elements 3 and 12.

Then, the temperature detection signal S31, which represents the detected temperature of the switching element 3, and the temperature detection signal S32, which represents the detected temperature of the switching element 12, are inputted to the feedback loop switching signal generating apparatus 26. A comparator compares the values respectively represented by the temperature detection signals. Thus, it is detected which of the present amounts of the switching elements, that is, the feedback loops is larger.

At that time, an amount Δt is preliminarily set as an offset amount used to determine a reference value of the difference in temperature between both the switching elements so that the comparison in value of difference therebetween is made when the difference in temperature therebetween is equal to or more than the reference value.

In the first embodiment, the switching element 12 is unconditionally turned on in the quiescent time, and the no-load time. Further, the ON/OFF control of the switching element 3 is performed by the switching control means 17 so that the electric current value of the electric current flowing through the electric current detector 6 is constant.

At that time, regardless of the presence/absence of the supply of an electric current to the machining gap, an electric current, the electric current value of which is set by the electric current command value signal S1, keeps flowing in the circuit of the loop 2. Thus, the steady-loss in each of the switching element 12 and the diode 5 increases. Thus, an amount of heat radiated therefrom also increases.

In this case, the values indicated by the temperature detection signals meet the following inequality: S31<S32. However, when these values satisfy the following inequality: |S31−S32|≧Δt, the feedback loop switching signal generating apparatus 33 outputs the feedback loop switching signals S33 and S34 by setting the signal levels of the feedback loop switching signals S33 and S34 at H and L, respectively. Further, the loop 1 is selected as the feedback loop.

When the switch control means 17 and 27 receive the feedback loop switch signals S33 and S34, respectively, an operation to be performed is changed from the operation of the loop 2 to the operation of the loop 1.

In the operation of the loop 1, the switching element 3 is unconditionally turned on in the quiescent time, and the no-load time. A switching control means 30 performs the ON/OFF control of the switching element 12 so that the value of an electric current flowing through the electric current detector 6 is constant.

Consequently, the steady-state loss of each of the switching element 3 and the diode 8 increases. Then, the magnitude relation in amount of radiated heat between the switching elements is turned. Thus, the values represented by the temperature detection signals satisfy the following inequality: S31>S32. When these values meet the following inequality: |S31−S32|≧Δt, the feedback loop switching signal generating apparatus 33 outputs the feedback loop switching signals S33 and S34 by setting the signal levels of the feedback loop switching signals S33 and S34 at L and H, respectively. Further, the loop 2 is selected as the feedback loop.

When the switch control means 17 and 27 receive the feedback loop switch signals S33 and S34, respectively, an operation to be performed is changed from the operation of the loop 1 to the operation of the loop 2.

Thus, the amounts of heat radiated from the switching elements are equalized by automatically switch the feedback loop between the loop 1 and the loop 2 according to the temperature loads imposed on the switching elements.

Further, in a case where the equalization of the amounts of heat is achieved by a simple way, it is advisable to preliminarily provide a circuit or a sequence program, which is adapted to perform the constant current control by alternately changing the feedback loop between the loop 1 and the loop 2, in the apparatus, without providing the feedback loop switching signal generating apparatus 26. Consequently, the amounts of heat radiated from the switching elements are almost equalized.

As described above, the power supply apparatus according to the fifth embodiment for an electric discharge machine is provided with a temperature detection means at each of the switching elements and is adapted to switch the feedback loop among a plurality of loops. Thus, the electric current loads and the heat loads on circuit blocks can be distributed thereamong. Consequently, the reliability of the apparatus is enhanced. Also, the length of life thereof can be increased.

Sixth Embodiment

Figure 6:
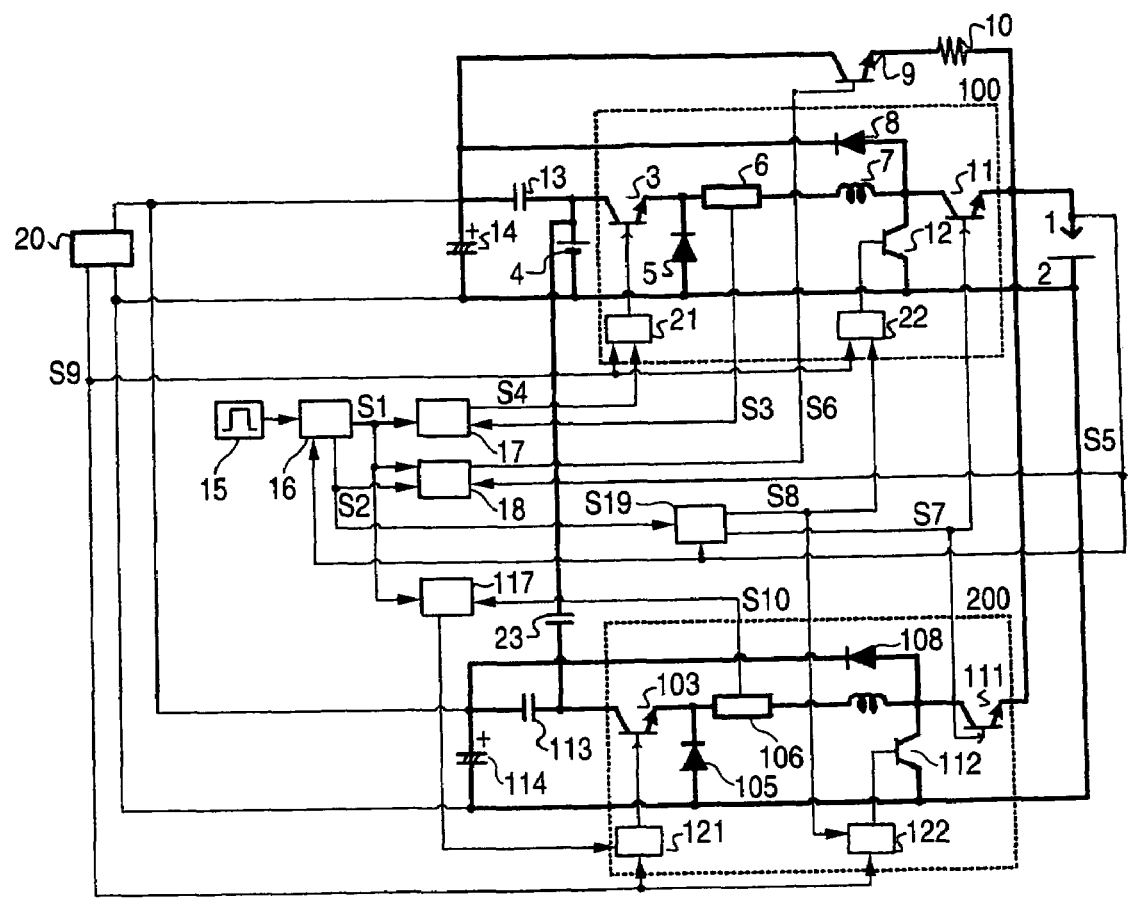
FIG. 6 is a diagram illustrating the configuration of a power supply apparatus for an electric discharge machine, which is a sixth embodiment of the invention.

FIG. 6 is a circuit diagram illustrating the configuration of a power supply apparatus for an electric discharge machine, which is a sixth embodiment of the invention.

This embodiment has a plurality of the first machining circuits provided in the third embodiment, that is, circuits each of which is enabled to perform the constant current control for rough-machining and to perform the constant voltage control for finish machining.

In this figure, a circuit including a switching element 103, a diode 105, an electric current detector 106, a reactor 107, a diode 108, a switching element 111, a switching element 112, contact points 113 constituted by an electromagnetic switch, a capacitor 114 serving as a voltage source, a selector 121, and a selector 122, is similar to the circuit including the switching element 3, the diode 5, the electric current detector 6, the reactor 7, the diode 8, the switching element 11, the switching element 12, the contact points 13 constituted by an electromagnetic switch, the capacitor 14 serving as a voltage source, the selector 21, and the selector 22 in the third embodiment.

Reference numeral 9 designates a second switching element, reference numeral 10 denotes an power limiting resistor, reference numeral 117 designates a switch control means that is adapted to make comparison between the value indicated by the electric current command value signal S1 and the present value indicated by the detection signal S10 which is detected by the electric current detector 106 and that is also adapted to output a drive control signal S14 according to a result of the comparison to control the switching element 103, and reference numeral 23 denotes contact points constituted by an electromagnetic switch.

Incidentally, a basic circuit including the switching element 3, the diode 5, the electric current detector 6, the reactor 7, the diode 8, the switching element 11, the switching element 12, the selector 21, and the selector 22 is defined as a circuit block 100, for convenience of description. A basic circuit including the switching element 103, the diode 105, the electric current detector 106, the reactor 107, the diode 108, the switching element 111, the switching element 112, the selector 121, and the selector 122 is defined as a circuit block 200, and is described below.

Next, an operation of the circuit of this power supply apparatus is described below.

The circuit block 100 is configured as a circuit having both of a step-up chopper circuit and a step-down chopper circuit. Similarly to the first embodiment and the third embodiment, the circuit block performs a constant current operation in the rough machining, and also performs a constant voltage operation as a step-up/step-down chopper in the finish machining.

The circuit block 200 has a configuration similar to that of the circuit block 100. An operation of the circuit block 200 is similar to that of the circuit block 100.

The circuit of this power supply apparatus has four operation modes shown in Table 1, corresponding to the combinations of the open/close states of the contact points 13, 113, and 23.

Incidentally, the selection of the open/close states of these sets of the contact points is controlled according to a command issued from the NC controller (not shown).

Next, each of the operation modes is described below.

Operation Mode 1

All of contact points 13, 23, and 113 are in a closed-state. Both of the circuit blocks 100 and 200 perform parallel operations as constant current control circuits.

The action of the selector 21 is selected to output an output signal S4 of the switch control means 17 to the first switching element 3. The action of the selector 22 is selected to output an output signal S8 of the switch control means 19 to the fourth switching element 12.

Similarly, the action of the selector 121 is selected to output an output signal S14 of the switch control means 117 to the switching element 103. The action of the selector 122 is selected to output an output signal S8 of the switch control means 19 to the switching element 112.

In this mode, both of the circuit blocks 100 and 200 perform operations similar to the operation in the first operation mode for the rough machining in the third embodiment. An output current of the circuit block 200 is superimposed on an output current of the circuit block 100. Thus, high-speed rough machining is performed using a large-current output.

Operation Mode 2

Only the contact points 23 are closed, and the contact points 13 and 113 are in an open state. Both of the circuit blocks 100 and 200 perform parallel operations as constant voltage control circuits.

The actions of the selectors 21, 22, 121, and 122 are selected to output an output PWM oscillation signal S9 of the control means 20 to the switching elements 3, 12, 103, and 112.

In this mode, both of the circuit blocks 100 and 200 perform operations similar to the operation in the second operation mode for the finish machining in the third embodiment. Thus, a constant voltage source, whose current capacity is obtained by adding the current capacity of the circuit block 200 to that of the circuit block 100, is realized.

Operation Mode 3

Only the contact points 113 are open, while the contact points 13 and 23 are in a closed-state. The circuit block 100 is made to perform an independent operation as a constant current control circuit. The circuit block 200 is caused to perform an independent operation as a constant voltage control circuit.

The action of the selector 21 is selected to output an output signal S4 of the switch control means 17 to the switching element 3. The action of the selector 22 is controlled to be selected to output an output signal S8 of the switch control means 19 to the fourth switching element 12.

On the other hand, the actions of the selectors 121 and 122 are controlled to be selected to output a PWM oscillation

TABLE 1

| | | Operation Modes of Circuit Blocks | | | |
|---|---|---|---|---|---|
| Operation Mode | Contact Points 13 | Contact Points 23 | Contact Points 113 | Circuit Block 100 | Circuit Block 200 |
| 1 | ON | ON | ON | Constant Current Circuit (Rough Machining) | Constant Current Circuit (Rough Machining) |
| 2 | OFF | ON | OFF | Constant Voltage Circuit (Finish Machining) | Constant Voltage Circuit (Finish Machining) |
| 3 | ON | ON | OFF | Constant Current Circuit (Rough Machining) | Constant Voltage Circuit (Finish Machining) |
| 4 | OFF | OFF | ON | Constant Voltage Circuit (Finish Machining) | Constant Current Circuit (Rough Machining) | signal S9, which is outputted by the control means 20, to the switching elements 103 and 112, respectively.

In this mode, the operation of the circuit block 100 is similar to that in the first mode for the rough machining in the third embodiment. The operation of the circuit block 200 is similar to that in the second mode for the finish machining in the third embodiment.

That is, the circuit block 200 forms a constant voltage sources in the parallel-connected voltage sources 14 and 114. The circuit block 100, and the second switching circuit for applying a voltage to the gap operate using the constant voltage source.

The principle of the operations of these circuits is similar to that of the operation of the third embodiment, so that a constant voltage output and a constant current output are simultaneously realized.

Operation Mode 4

Only the contact points 113 are closed, and the contact points 13 and 113 are in an open state. The circuit block 100 is made to perform an independent operation as a constant voltage control circuit. The circuit block 200 is caused to perform an independent operation as a constant current control circuit.

The actions of the selectors 21 and 22 are selected to output a PWM oscillation signal S9, which is outputted by the control means 20, to the switching elements 3 and 12, respectively.

On the other hand, the action of the selector 121 is selected to output an output signal S14 of the switch control means 117 to the switching element 103. The action of the selector 122 is controlled to be selected to output an output signal S8 of the switch control means 19 to the switching element 112.

In this mode, the operation of the circuit block 100 is similar to that in the second operation mode for finish machining in the third embodiment. The operation of the circuit block 200 is similar to that in the first operation mode for rough machining in the third embodiment.

That is, the circuit block 100 forms a constant voltage sources in the parallel-connected voltage sources 14 and 114. The circuit block 200, and the second switching circuit for applying a voltage to the gap operate using the constant voltage source.

The principle of the operations of these circuits is similar to that of the operation of the third embodiment, so that a constant voltage output and a constant current output are simultaneously realized, similar to the operation mode 3.

As described above, the power supply apparatus for an electric discharge apparatus according to the sixth embodiment is provided with a plurality of circuit blocks. An operation of the circuit using a constant voltage source can be performed not only in the finish machining but in the rough machining in which a large current is outputted. Thus, even when the commercial power supply voltage is in an unstable state in which the commercial power supply voltage performs an increasing variation and a decreasing variation, the machining voltage and the machining current of the finish machining can be made to be always constant. The machining time of the finish machining is favorable. The reproducibility of the machining surface roughness is good.

Further, in the rough machining that does not high machining precision, parallel-operations performed by the plurality of circuit blocks. Thus, an output of a large current proportional to the number of circuit blocks. Consequently, the speed of the rough machining is enabled. Thus, the machining time can considerably be reduced. The productivity can be enhanced.

Also, in the finish machining, the machining current can be increased in proportional to the number of circuit blocks by causing the plurality of circuit blocks to perform parallel operations. Thus, medium machining to be performed between the rough machining and the finish machining is enabled.

Consequently, the finish machining using a weak current can be performed on a rough machining surface, which is obtained by the rough machining, after the rough machining surface is smoothed to some extent. Thus, an amount of a removed part of the workpiece in the finish machining can be minimized. Thus, the machining time can be reduced. A total of machining time can considerably be decreased according to some conditions for machining.

Seventh Embodiment

Figure 7:
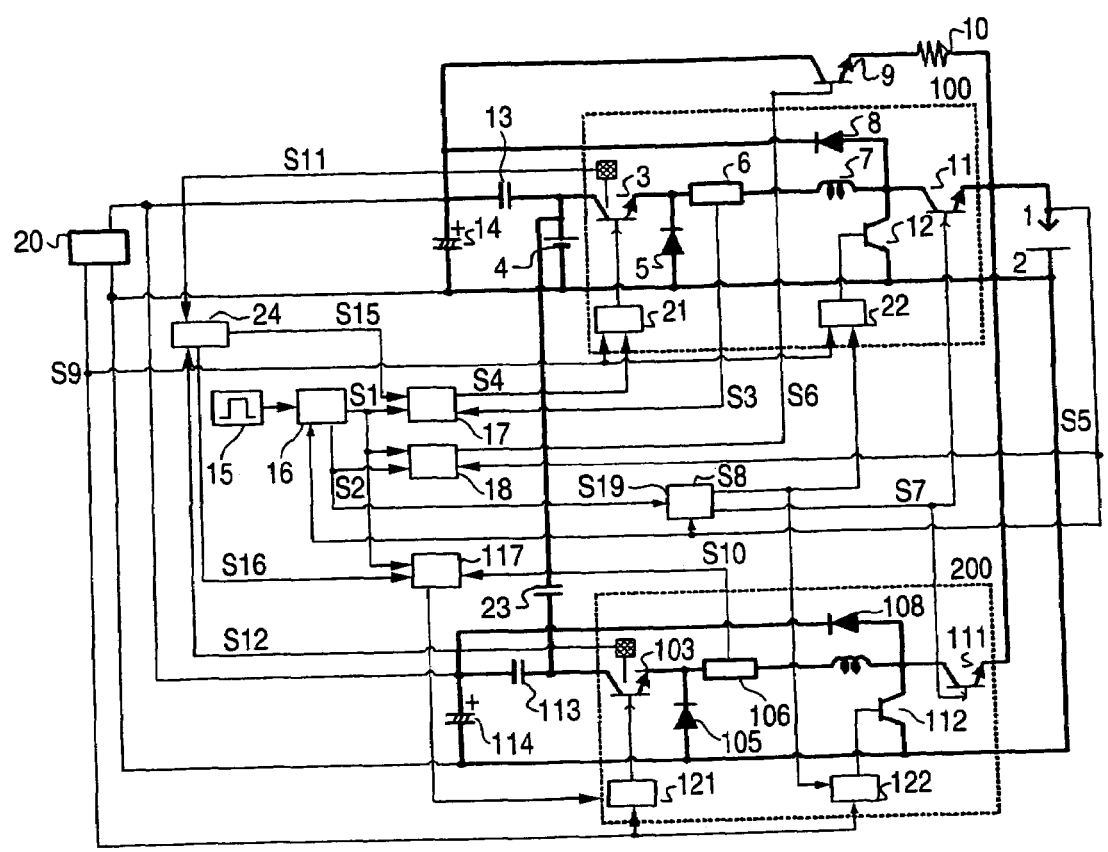
FIG. 7 is a diagram illustrating the configuration of a power supply apparatus for an electric discharge machine, which is a seventh embodiment of the invention.

FIG. 7 is a circuit diagram illustrating the configuration of a power supply apparatus for an electric discharge machine, which is a seventh embodiment of the invention.

This embodiment is configured by adding temperature detection means in the vicinity of the switching elements 3 and 103 of the circuit of the sixth embodiment, respectively.

In this figure, reference numeral 24 designates an electric current command value adjustment signal generating apparatus adapted to make comparison between the value indicated by a temperature detection signal S11, which is outputted from the temperature detection means and represents the temperature of the switching element 3, and the value indicated by a temperature detection signal S12, which is outputted from the temperature detection means and represents the temperature of the switching element 103, and also adapted to output electric current value adjustment signal generating signals S15 and S16 according to a result of the comparison. The other constituents of the seventh embodiment are similar to the corresponding constituents of the fifth embodiment.

Next, an operation of the circuit of this power supply apparatus is described in the case of the operation mode 1 in the sixth embodiment.

In this operation mode, both of the circuit blocks 100 and 200 are operated in parallel as a constant current control circuit to perform high-speed rough machining, and output large currents.

At that time, each of the switching elements constituting the circuit radiates heat due to switching loss and to steady-state loss.

To take heat from the switching elements, generally, a radiation fin (not shown) is provided on the apparatus. Each of the switching elements is attached and fixed to the radiation fin.

The temperature detection means are also attached and fixed to the same radiation fin. Thus, the temperature of each of the switching elements 3 and 103 can be detected.

Incidentally, this temperature data can be taken in by using an analog voltage signal in a case where the temperature detection means is a thermocouple, and by using a contact-point signal in a case where a bimetal thermometer is the temperature detection means.

The temperature detection signal S11 in the circuit block 100 and the temperature detection signal S12 in the circuit block 200 are inputted to the electric current command value adjustment signal generating apparatus 24. These temperature detection signals are compared with each other in a comparator. Thus, it is detected which of the circuit blocks 100 and 200 presently radiates a larger amount of heat.

When it is found as a result that the circuit block 100 radiates a larger amount of heat, the value represented by the electric current command value adjustment signal S15 to be outputted to the switch control means 17 is set at a negative value. The value represented by the electric current command value adjustment signal S16 to be outputted to the switch control means 17 is set at a positive value.

Although the switch control means 17 makes comparison between the value represented by the electric current command value signal S1 and the present value represented by the detection signal S3 detected by the electric current detector 6, the switch control means 17 in this embodiment first adds a value indicated by the electric current command value adjustment signal S15 to the value represented by the electric current command value signal S1 and then makes the comparison between a value obtained by the addition and the represented by the detection signal S3 detected by the electric current detector 6.

That is, the comparison between the value represented by the resultant signal (S1+S15) and the value represented by the signal S3 is performed. In a case where the value represented by the signal S15 is a negative value, a value smaller than the value represented by the electric current command value signal S1 is compared with the value represented by the detection signal S3. Thus, the control operation is performed by using the value indicated by the electric current command value signal, which value is apparently reduced.

On the other hand, similarly, the switch control means 117 makes comparison between the value represented by the electric current command value signal S1 and the value represented by the detection signal S13, which indicates a result of the detection performed by the electric current detector 106. Incidentally, in the seventh embodiment, the switch control means 117 in the seventh embodiment first adds the value represented by the electric current command value adjustment signal S16 to the value indicated by the electric current command value signal S1 and then makes comparison between a value obtained by the addition and the value represented by the detection signal S3.

That is, the comparison between the value represented by the resultant signal (S1+S16) and the value represented by the signal S3 is performed. In a case where the value represented by the signal S16 is a positive value, a value larger than the value represented by the electric current command value signal S1 is compared with the value represented by the detection signal S3. Thus, the control operation is performed by using the value indicated by the electric current command value signal, which value is apparently increased.

For example, in a case where the distribution of an output current is such that an amount of an output current corresponding to the circuit block 100 is 50 A, and that an amount of an output current corresponding to the circuit block 200 is 50 A, when the amount of heat radiated from the circuit block 100 increases due to variation in the characteristic of the element, the distribution of the output current is changed by maintaining a total amount of output current at 100 A so that an amount of an output current corresponding to the circuit block 100 is 40 A, and that an amount of an output current corresponding to the circuit block 200 is 60 A.

Consequently, the electric current value, the constant current control of which is performed by the circuit block 100 having radiated a larger amount of heat, is reduced. The amount of heat radiated by the circuit block 100 is reduced.

Conversely, the electric current value, the constant current control of which is performed by the circuit block 200 having radiated a smaller amount of heat, is increased. The amount of heat radiated by the circuit block 200 is increased.

Incidentally, in a case where the amount of heat radiated from the circuit block 200 is larger, the operations are inversely performed.

The amounts of heat radiated from the circuit blocks 100 and 200 are equalized by performing repeat control of such a sequence of operations As described above, the power supply apparatus according to the seventh embodiment for an electric discharge machine is provided with a temperature detection means at each circuit block. Thus, even in a case where the characteristic of the element varies with the circuit block, the electric current load and the heat lead can be prevented from being concentrated to a specific circuit block. Parallel operations of the circuit blocks, to each of which even load is applied, can be achieved. Consequently, the reliability of the apparatus is enhanced. Additionally, the lifetime thereof is increased.

Eighth Embodiment

Figure 8:
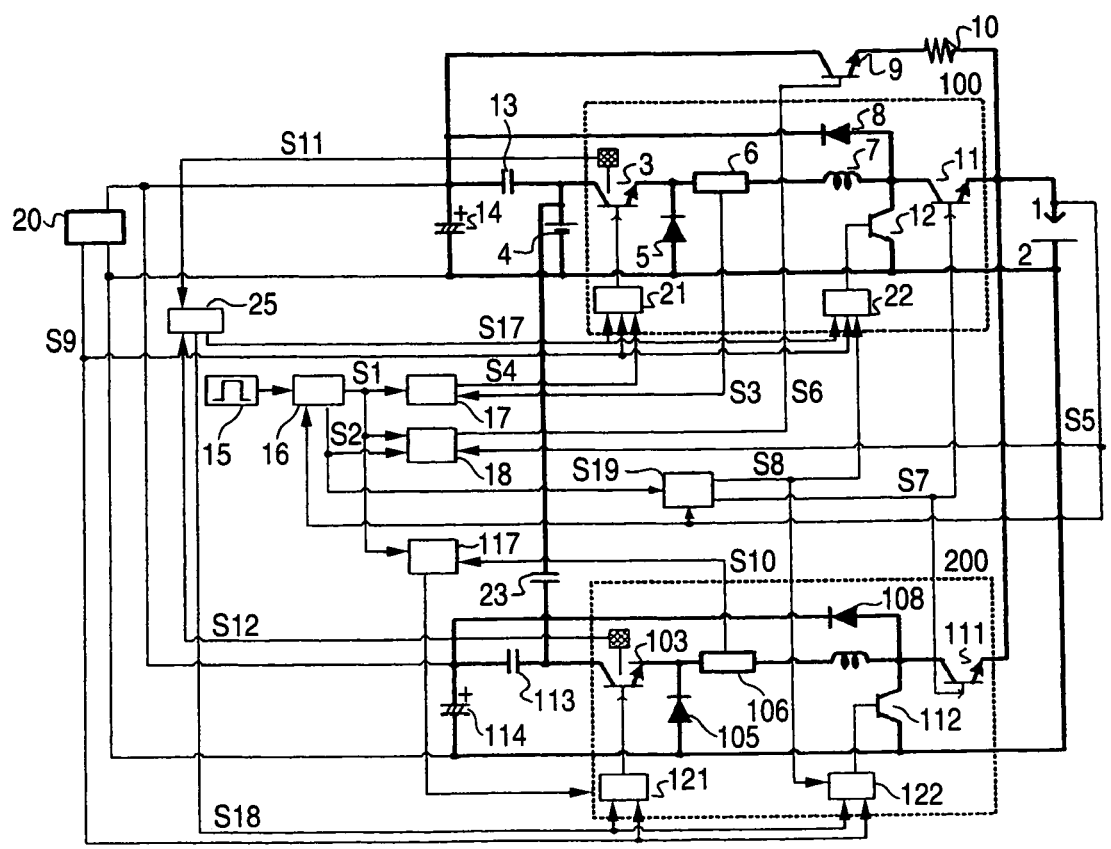
FIG. 8 is a diagram illustrating the configuration of a power supply apparatus for an electric discharge machine, which is an eighth embodiment of the invention.

FIG. 8 is a circuit diagram illustrating the configuration of a power supply apparatus for an electric discharge machine, which is an eighth embodiment of the invention.

This embodiment is configured by adding temperature detection means, which respectively correspond to the switching elements, to the circuit of the sixth embodiment.

In FIG. 8, reference numeral 25 designate a selector control means adapted to make comparison between values respectively represented by temperature detection signals S11 and S12 and to output selection command signals S17 and S18 according to a result of the comparison. The other constituents of the eight embodiment are similar to the corresponding constituents of the sixth embodiment.

Next, an operation of the circuit of this power supply apparatus is described in the case of the operation mode 3 in the sixth embodiment.

In this operation mode, the circuit block 100 is made to perform an independent operation as a constant current control circuit for high-speed rough machining. The circuit block 200 is caused to perform an independent operation as a constant voltage control circuit.

Although depending upon the electric current value to be controlled, generally, in a case where a large current is outputted, it is more frequent that the amount of heat radiated by the circuit block 100 operating as a constant current control circuit is larger.

Similarly to the seventh embodiment, the temperature of each of the switching element 3 of the circuit block 100 and the switching element 103 of the circuit block 200 is detected by the temperature detection means.

A temperature detection signal S11 outputted from the circuit block 100 and a temperature detection signal S12 outputted from the circuit block 200 are inputted to the selector control means 25. These temperature detection signals are compared with each other in a comparator. Thus, it is detected which of the circuit blocks 100 and 200 presently radiates a larger amount of heat.

In a case where it is found as a result that the amount of heat radiated from the circuit block 100 is larger, a PWM oscillation signal S9 is selected according to selector control signal S17, which is outputted to the selectors 21 and 22, as a signal used to perform the ON/OFF control of the switching element. Thus, an operation to be performed by the circuit block 100 having operated as a constant current control circuit is changed to an operation of a constant voltage control circuit.

Simultaneously with this, the selection of a signal for performing the ON/OFF control of the switching element is changed by a selector control signal S18 outputted to the selectors 121 and 122. Thus, an operation to be performed by the circuit block 200 having operated as a constant voltage control circuit is changed to an operation of a constant current control circuit. Consequently, the operation mode 3 is automatically changed to the operation mode 4.

As a result, the circuit block 100 performs an independent operation as a constant voltage control circuit, while the circuit block 200 performs an independent operation as a constant current control circuit.

That is, the operation mode 3 and the operation mode 4 are automatically switched between the circuit blocks 100 and 200. Thereafter, in the case where the magnitude relation between the amount of heat generated by the circuit block 100 and the amount of heat generated by the circuit block 200 is reversed, the aforementioned operations are inversely performed. The repeat control of a sequence of operations of switching the operation modes between the two circuits, which differ in temperature load from each other, is performed. Consequently, the amounts of heat generated by the circuit blocks 100 and 200 are equalized.

As described above, the power supply apparatus according to the eighth embodiment for an electric discharge machine is provided with a temperature detection means in each of the circuit blocks. The operation mode is not fixed in each of the circuit blocks. Thus, the operation mode can automatically be changed according to the current load and the heat load of each circuit block. Consequently, the reliability of the apparatus is enhanced. Additionally, the lifetime thereof is increased.

INDUSTRIAL APPLICABILITY

The invention is suited for being applied to a power supply for an electric discharge machine adapted to supply a machining power to between an electrode, which is provided in machining liquid, and a workpiece.

The invention claimed is:

1. A power supply apparatus for an electric discharge machine configured to perform melt-removal on a workpiece by supplying pulse-like power to a machining gap between an electrode and the workpiece, comprising:
   a second machining circuit that controls a voltage to be applied to the machining gap and to cause a discharge in the machining gap;
   a first machining circuit that supplies, when a discharge occurring in the machining gap in response to application of a voltage by said second machining circuit is detected in a first drive mode, a constant current to the machining gap, and also configured to operate to adapt a voltage source in said second machining circuit to output a constant voltage in a second drive mode; and
   connection means configured to close connection to a power supply to supply electric power through said second machining circuit in the first drive mode and also configured to open the connection to said power supply in the second drive mode so that said second machining circuit operates at a constant voltage supplied from said voltage source.

2. The power supply apparatus for an electric discharge machine according to claim 1, wherein:
   said first machining circuit comprises:
   first switching means that connect to said power supply;
   electric current detection means that detects an electric current value of an electric current flowing;
   third switching means that performs connection between a reactor and the machining gap;
   fourth switching means series-connected to said power supply through said first switching means, said electric current detection means, and said reactor; and
   a second diode that feeds an electric current remaining in said reactor;
   in the first drive mode, a constant current is fed to an electrical energy storage circuit, which includes said first switching means, said reactor, and said fourth switching means, by controlling said first switching means according to an electric value detected by said electric current detection means; and
   in the second drive mode, the voltage value of said voltage source is set by controlling said first switching means according to a voltage of said voltage source to be a reference value.

3. The power supply apparatus for an electric discharge machine according to claim 1, wherein:
   said first machining circuit comprises:
   first switching means adapted to perform connection to said power supply;
   electric current detection means that detects an electric current value of an electric current flowing;
   third switching means that performs connection between a reactor and the machining gap;
   fourth switching means series-connected to said power supply through said first switching means, said electric current detection means, and said reactor; and
   a second diode adapted to feed an electric current remaining in said reactor;
   in the first drive mode, a constant current is fed to an electrical energy storage circuit, which includes said first switching means, said reactor, and said fourth switching means, by controlling said first switching means according to an electric value detected by said electric current detection means; and
   in the second drive mode, the voltage value of said voltage source is set by controlling said fourth switching means according to a voltage of said voltage source to be a reference value.

4. The power supply apparatus for an electric discharge machine according to claim 1, wherein:
   said first machining circuit comprises:
   first switching means adapted to perform connection to said power supply;
   electric current detection means that to detects an electric current value of an electric current flowing;
   third switching means that performs connection between a reactor and the machining gap;
   fourth switching means series-connected to said power supply through said first switching means, said electric current detection means, and said reactor; and
   a second diode that feeds an electric current remaining in said reactor;
   in the first drive mode, a constant current is fed to an electrical energy storage circuit, which includes said first switching means, said reactor, and said fourth switching means, by controlling said first switching means according to an electric value detected by said electric current detection means; and
   in the second drive mode, the voltage value of said voltage source is set by controlling said first switching means and said fourth switching means according to a voltage of said voltage source to be a reference value.

5. The power supply apparatus for an electric discharge machine according to claim 2, wherein:

PWM control is performed according to the voltage of said voltage source as control of the first and fourth switching means in the second drive mode.

6. The power supply apparatus for an electric discharge machine according to claim 2, further comprising:
change means that changes the reference voltage value of said voltage source.

7. The power supply apparatus for an electric discharge machine according to claim 1, wherein:
the first drive mode corresponds to rough machining of electric discharge machining; and
the second drive mode corresponds to finish machining of electric discharge machining.

8. The power supply apparatus for an electric discharge machine according to claim 1, wherein:
in the first drive mode, application of a voltage is stopped by said second machining circuit when an electric discharge is detected in the machining gap.

9. The power supply apparatus for an electric discharge machine according to claim 1, wherein:
in the first drive mode, said second machining circuit is controlled according to an electric current value sent from said electric current detection means to compensate a ripple component of a machining current supplied from said first machining circuit to the machining gap.

10. The power supply apparatus for an electric discharge machine according to claim 1, wherein:
a first closed circuit, which includes said first switching means, said electric current detection means, said reactor, and said second diode that feeds electric current remaining in said reactor to said voltage source, and a second closed circuit, which includes said electric current detection means, said reactor, said fourth switching means, and a first diode connected to said electric current detection means in a forward direction from said fourth switching means, are switched according to temperature load conditions of said first switching means and said second switching means.

11. The power supply apparatus for an electric discharge machine according to claim 1, wherein:
a plurality of power supply devices, each of which includes a first machining circuit, a second machining circuit, and connection means, are provided by being connected through second connection means, and characterized by further comprising:
independent control means that switches said connection means and said second connection means.

12. The power supply apparatus for an electric discharge machine according to claim 11, further comprising:
temperature detection means that detects a temperature of said switching means, and
wherein the first machining circuit comprises switching means, control of said switching means of said first machining circuit is switched according to temperature load conditions.

13. The power supply apparatus for an electric discharge machine according to claim 12, wherein:
switching of said switching means is performed in a plurality of switching circuits, the parallel operation of which is performed in the first drive mode, to change a distribution of an electric current value, the constant current control of which is performed according to the temperature load conditions.

14. The power supply apparatus for an electric discharge machine according to claim 12, wherein:
switching of said switching means is performed by switching between the first drive mode and the second drive mode to each other according to the temperature load conditions in said power supply apparatus in which said switching circuit operated in the first drive mode and said switching circuit operated in the second drive mode coexist.

15. A method for controlling a power supply in a power supply apparatus for an electric discharge machine, which includes:
a second machining circuit that controls a voltage applied to a machining gap between an electrode and a workpiece and that causes an electric discharge in the machining gap;
a first machining circuit including first switching means that performs connection to a power supply, electric current detection means that detects an electric current value of an electric current flowing, third switching means that performs connection between a reactor and the machining gap, fourth switching means series-connected to said power supply through said first switching means, said electric current detection means, and said reactor, and a second diode adapted to feed an electric current remaining in said reactor; and
connection means that controls an operation of opening and closing between said second machining circuit and said power supply, wherein the method comprises:
in the first drive mode, control is performed so that when an electric discharge is caused in the machining gap by application of a voltage thereto by said second machining circuit, a constant current is supplied to the machining gap, and so that in the second drive mode, a voltage source configured to supply electric power in said second machining circuit to output a constant voltage.

16. The power supply control method for an electric discharge machine according to claim 15, wherein:
when an electric discharge occurs in the first drive mode, said first switching means is controlled according to an electric value detected by said electric current detection means to thereby cause an electric energy storage circuit, which includes said first switching means, said reactor, and a fourth switching means, to supply a constant current; and
in the second drive mode, a value of a voltage of said power supply is set to be a reference value by controlling said first switching means according to the voltage of said voltage source.

17. The power supply control method for an electric discharge machine according to claim 15, wherein:
when an electric discharge occurs in the first drive mode, said first switching means is controlled according to an electric value detected by said electric current detection means to thereby cause an electric energy storage circuit, which includes said first switching means, said reactor, and a fourth switching means, to supply a constant current; and
in the second drive mode, a value of a voltage of said power supply is set to be a reference value by controlling said fourth switching means according to the voltage of said voltage source.

18. The power supply control method for an electric discharge machine according to claim 15, wherein:
when an electric discharge occurs in the first drive mode, said first switching means is controlled according to an electric value detected by said electric current detection means to thereby cause an electric energy storage circuit, which includes said first switching means, said reactor, and said fourth switching means, to supply a constant current; and in the second drive mode, a value of a voltage of said power supply is set to be a reference value by controlling said first switching means and said fourth switching means according to the voltage of said voltage source.

19. The power supply control method for an electric discharge machine according to claim 16, wherein:
PWM control is performed according to the voltage of said voltage source as control of switching means in the second drive mode.

20. The power supply control method for an electric discharge machine according to claim 15, wherein:
the first drive mode corresponds to rough machining of electric discharge machining; and
the second drive mode corresponds to finish machining of electric discharge machining.

21. The power supply control method for an electric discharge machine according to claim 15, wherein:
in the first drive mode, application of a voltage is stopped by said second machining circuit when an electric discharge is detected in the machining gap.

22. The power supply control method for an electric discharge machine according to claim 15, wherein:
in the first drive mode, said second machining circuit is controlled according to an electric current value sent from said electric current detection means to compensate a ripple component of a machining current supplied from said first machining circuit to the machining gap.

23. The power supply control method for an electric discharge machine according to claim 15, wherein:
temperature detection means adapted to detect a temperature of said switching means is provided;
a first closed circuit, which includes said first switching means, said electric current detection means, said reactor, and said second diode that feeds electric current remaining in said reactor to said voltage source, and a second closed circuit, which includes said electric current detection means, said reactor, said fourth switching means, and a first diode connected to said electric current detection means in a forward direction from said fourth switching means, are switched according to temperature load conditions.

24. The power supply control method for an electric discharge machine according to claim 15, wherein:
a plurality of power supply devices, each of which includes a first machining circuit, a second machining circuit, and connection means, are provided by being connected through second connection means; and
said connection means and said second connection means are switched to each other.

25. The power supply control method for an electric discharge machine according to claim 24, wherein:
temperature detection means that detects a temperature of said switching means is provided; and
switching of said switching means is performed in a plurality of switching circuits, the parallel operation of which is performed in the first drive mode, to change a distribution of an electric current value, the constant current control of which is performed according to the temperature load conditions.

26. The power supply control method for an electric discharge machine according to claim 24, wherein:
temperature detection means that detects a temperature of said switching means is provided; and
switching of said switching means is performed by switching between the first drive mode and the second drive mode to each other according to the temperature load conditions in said power supply apparatus in which said switching circuit operated in the first drive mode and said switching circuit operated in the second drive mode coexist.

* * * * *